(12) United States Patent
Theodosakis et al.

(10) Patent No.: US 12,728,759 B2
(45) Date of Patent: Sep. 8, 2026

(54) SYSTEMS AND METHODS FOR BATTERY SYSTEM DISTRIBUTED WATER INGRESS DETECTION

(71) Applicant: Textron Inc., Providence, RI (US)

(72) Inventors: Gregory August Theodosakis, Martinez, GA (US); Russell William King, Evans, GA (US); Charles Daniel Dauchess, North Augusta, SC (US)

(73) Assignee: TEXTRON INNOVATIONS INC., Providence, RI (US)

( * ) Notice: Subject to any disclaimer, the term of this patent is extended or adjusted under 35 U.S.C. 154(b) by 56 days.

(21) Appl. No.: 18/887,194

(22) Filed: Sep. 17, 2024

(65) Prior Publication Data

US 2026/0077675 A1 Mar. 19, 2026

(51) Int. Cl.

| | |
|---|---|
| ***B60L 58/10*** | (2019.01) |
| ***B60L 3/00*** | (2019.01) |
| ***B60L 3/04*** | (2006.01) |
| ***G07C 5/08*** | (2006.01) |
| ***H01M 10/42*** | (2006.01) |
| ***H01M 10/48*** | (2006.01) |
| ***H01M 50/249*** | (2021.01) |

(52) U.S. Cl.

CPC ............. *B60L 58/10* (2019.02); *B60L 3/0046* (2013.01); *G07C 5/0816* (2013.01); *H01M 10/425* (2013.01); *H01M 10/48* (2013.01); *H01M 50/249* (2021.01); *B60L 3/04* (2013.01); *B60L 2200/22* (2013.01); *H01M 2010/4271* (2013.01); *H01M 2220/20* (2013.01)

(58) Field of Classification Search

CPC .. B60L 58/10; B60H 1/00407; H01M 10/425; H01M 50/204; H01M 10/6569; G01M 3/04; G01M 3/40

See application file for complete search history.

(56) References Cited

U.S. PATENT DOCUMENTS

| | | | | |
|---|---|---|---|---|
| 5,399,445 | A | 3/1995 | Tinker | |
| 5,824,883 | A | 10/1998 | Park et al. | |
| 6,308,728 | B1 | 10/2001 | Frazier | |
| 6,435,293 | B1 * | 8/2002 | Williams | B60H 1/00407 62/323.3 |
| 7,557,466 | B2 | 7/2009 | Wong et al. | |
| 8,211,559 | B1 | 7/2012 | Waggoner | |
| 8,723,525 | B2 | 5/2014 | Stits et al. | |

(Continued)

FOREIGN PATENT DOCUMENTS

| | | | | |
|---|---|---|---|---|
| CN | 115597799 A * | 1/2023 | | G01M 3/40 |
| WO | WO-2019035599 A1 * | 2/2019 | | G01M 3/04 |

*Primary Examiner* — Yuri Kan

(74) *Attorney, Agent, or Firm* — Foley & Lardner LLP

(57) ABSTRACT

A golf vehicle includes a chassis, a battery pack supported by the chassis, and a plurality of sensors configured to facilitate detecting moisture. The battery pack is oriented relative to the chassis in a respective orientation of a plurality of possible orientations. The plurality of sensors are positioned at various locations about the battery pack. Each sensor is located at a respective point of the battery pack relative to a particular orientation. The vehicle control system is configured to acquire moisture signals from the sensors, and to determine at least one of the respective orientation of the battery pack or a severity of a presence of moisture within the battery pack based on the moisture signals.

20 Claims, 9 Drawing Sheets

(56) References Cited

U.S. PATENT DOCUMENTS 8,865,333 B2 10/2014 Phlegm et al.
10,510,238 B1 12/2019 Billman et al.
10,707,538 B2 7/2020 Unveren et al.
10,714,926 B2 7/2020 Demarco et al.
10,840,568 B2 11/2020 Yoon
11,437,654 B2 9/2022 Yamashima et al.
11,646,454 B2 5/2023 Takahashi et al.
11,777,183 B2 10/2023 Werner et al.
11,811,032 B2 11/2023 Glad et al.
2004/0162698 A1 8/2004 Iwaizono
2007/0275296 A1 11/2007 Ueda et al.
2009/0123816 A1 5/2009 Jang
2010/0164474 A1 7/2010 Oglesbee et al.
2011/0129697 A1 6/2011 Sim et al.
2011/0135984 A1 6/2011 Ekchian
2011/0217573 A1 9/2011 Kritzer et al.
2011/0256432 A1 10/2011 Tenhouten et al.
2012/0121942 A1 5/2012 Kim
2012/0132286 A1* 5/2012 Lim .................... H01M 50/204 137/396
2012/0133521 A1 5/2012 Rothkopf et al.
2012/0251859 A1 10/2012 Payne et al.
2012/0299555 A1 11/2012 Tam et al.
2013/0088094 A1 4/2013 Paik
2013/0209844 A1 8/2013 Gless et al.
2013/0214802 A1 8/2013 Adachi
2013/0252043 A1 9/2013 Allison
2014/0087230 A1 3/2014 Schaefer
2014/0242422 A1 8/2014 Hakansson et al.
2014/0242427 A1 8/2014 Tanaka et al.
2014/0295218 A1 10/2014 Hakansson et al.
2015/0016001 A1 1/2015 Quirk et al.
2015/0132620 A1 5/2015 Sahner et al.
2015/0357845 A1 12/2015 Railey
2016/0012708 A1 1/2016 Smith
2016/0149270 A1 5/2016 Albert et al.
2016/0218556 A1 7/2016 Slaby et al.
2016/0233563 A1* 8/2016 Oshima ............. H01M 10/6569
2017/0288451 A1 10/2017 Trusty et al.
2018/0366792 A1 12/2018 Stachewicz et al.
2019/0131668 A1 5/2019 Bitauld et al.
2020/0096410 A1 3/2020 Lindemann
2020/0292404 A1 9/2020 Min
2022/0328943 A1 10/2022 Mueller et al.
2022/0359920 A1 11/2022 Omagari
2023/0032112 A1 2/2023 Pokora et al.
2023/0098889 A1* 3/2023 Ferguson ............ H01M 10/425 701/22
2023/0219422 A1 7/2023 Wagner et al.

* cited by examiner

SYSTEMS AND METHODS FOR BATTERY SYSTEM DISTRIBUTED WATER INGRESS DETECTION

BACKGROUND

Water intrusion in battery systems can lead to degradation of battery system performance. Moisture within a battery pack can cause short circuits, corrosion, and potential faults of battery systems.

SUMMARY

One embodiment relates to a golf vehicle system. The golf vehicle system includes a golf vehicle. The golf vehicle includes a chassis, a battery pack supported by the chassis, a plurality of sensors configured to facilitate detecting moisture, and a vehicle control system. The battery pack is oriented relative to the chassis in a respective orientation of a plurality of possible orientations. The plurality of sensors are positioned at various locations about the battery pack. Each sensor of the plurality of sensors is located at a respective point of the battery pack relative to a particular orientation. The vehicle control system is configured to acquire moisture signals from the plurality of sensors, and to determine at least one of the respective orientation of the battery pack or a severity of a presence of moisture within the battery pack based on the moisture signals.

Another embodiment relates to a vehicle system. The vehicle system a battery pack, a plurality of sensors, and a control system. The battery pack is configured to be oriented in a respective orientation of a plurality of possible orientations when installed on a vehicle. The plurality of sensors are positioned at various locations about the battery pack. The plurality of sensors are configured to facilitate detecting moisture. Each sensor of the plurality of sensors is located at a respective low point of the battery pack relative to a particular orientation of the plurality of possible orientations of the battery pack. The control system is configured to acquire moisture signals from the plurality of sensors and determine at least one of the respective orientation of the battery pack or a severity of a presence of moisture within the battery pack based on the moisture signals.

Still another embodiment relates to a vehicle system. The vehicle system includes a battery pack, a plurality of first sensors, a second sensor, and a control system. The battery pack is configured to be oriented in a respective orientation of a plurality of possible orientations when installed on a vehicle. The plurality of first sensors are positioned at various locations about the battery pack. The plurality of first sensors configured to facilitate detecting moisture. Each sensor of the plurality of first sensors is located at a respective low point of the battery pack relative to a particular orientation of the plurality of possible orientations of the battery pack. The second sensor is configured to facilitate detecting at least one of orientation characteristics or motion characteristics of the battery pack. The control system is configured to acquire moisture signals from the plurality of first sensors, determine at least one of the respective orientation of the battery pack or a severity of a presence of moisture within the battery pack based on the moisture signals, acquire at least one of orientation signals or motion signals from the second sensor, and confirm the at least one of the severity of the presence of moisture or the respective orientation of the battery pack based on the at least one of the orientation signals or the motion signals.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
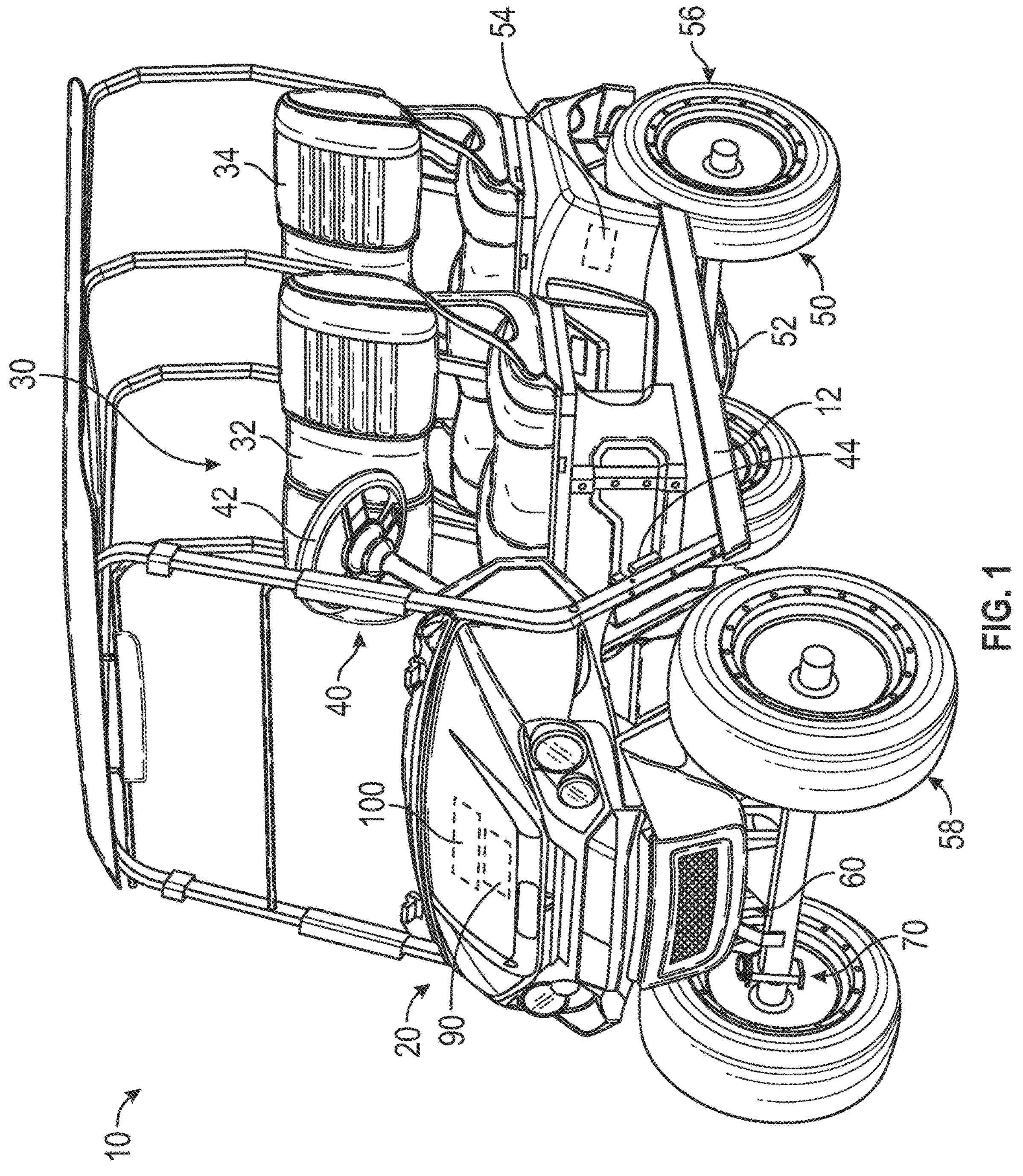
FIG. 1 is a perspective view of a vehicle, according to an exemplary embodiment.
Figure 2:
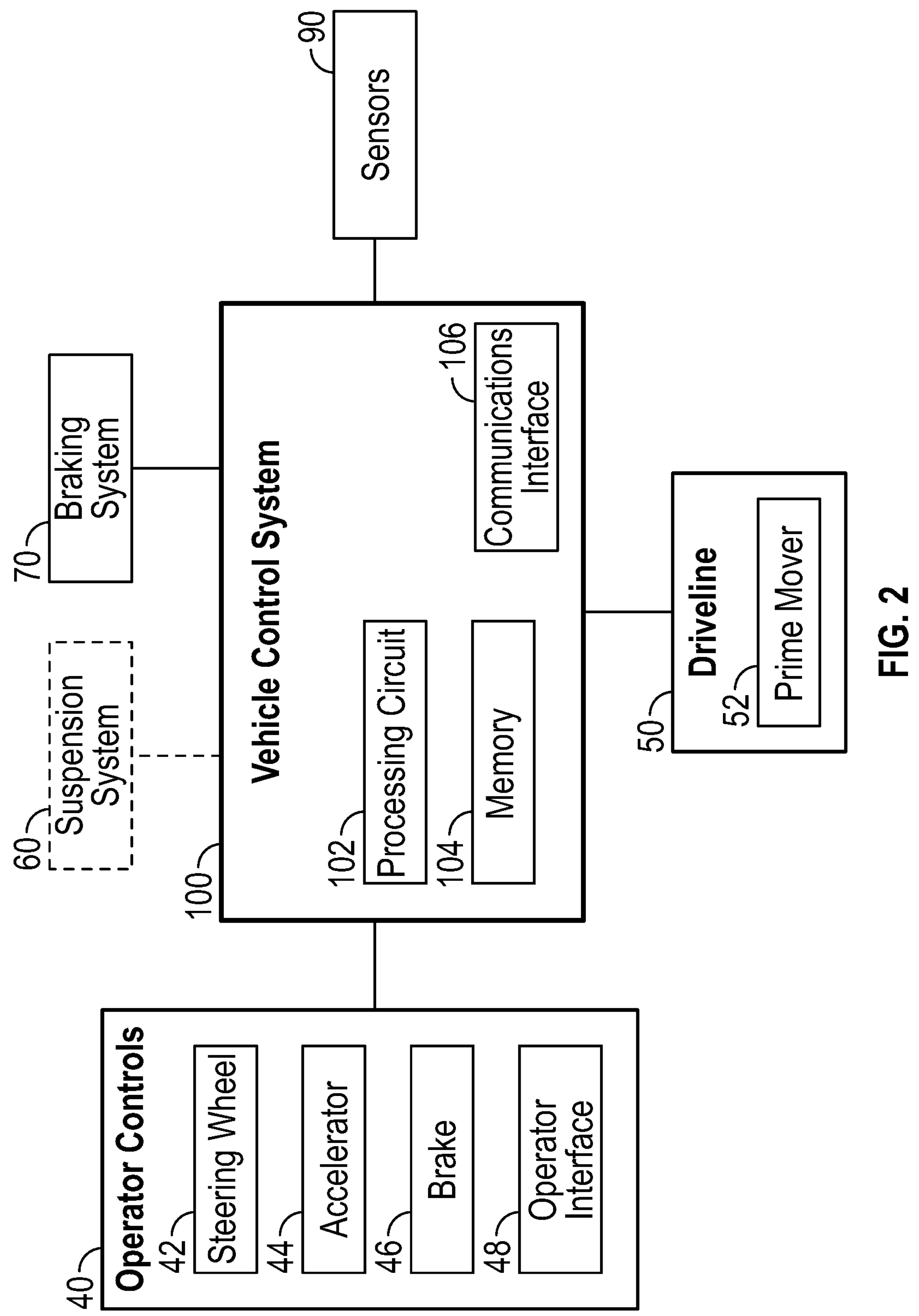
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart or vehicle, an all-terrain vehicle ("ATV"), a utility task vehicle ("UTV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor (e.g., motor 53) and the energy storage 54 is a battery system (e.g., battery module 57, add-on battery module(s) 59, etc.). In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, electric regenerative braking is employed (e.g., via the prime mover 52, an electric motor, etc.) in combination with or instead of using the braking system 70 to facilitate braking of one or more components of the driveline 50.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, Doppler sensors, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Electrified Driveline

Figure 3:
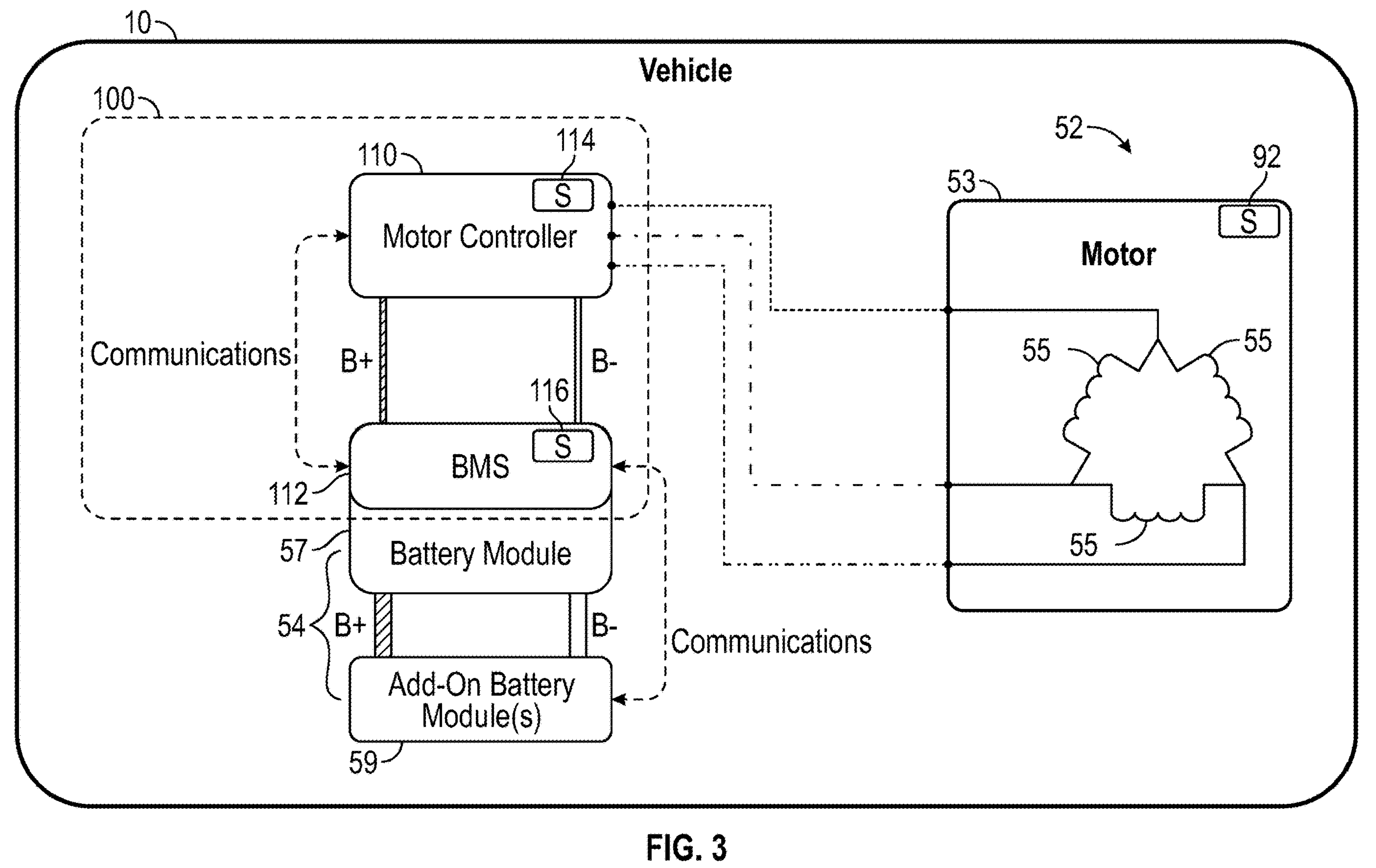
FIG. 3 is another schematic block diagram of the vehicle of FIG. 1, according to an exemplary embodiment.

According to the exemplary embodiments shown in FIG. 3, the driveline 50 of the vehicle 10 is configured as an electrified driveline where (a) the prime mover 52 is configured as a three-phase, alternating current ("AC") electric motor, shown as motor 53, including three sets of windings, shown as motor windings 55, and a first sensor, shown as motor sensor 92; (b) the energy storage 54 is configured as a battery system including a first battery pack or module, shown as battery module 57, and one or more second battery packs or modules, shown as add-on battery module(s) 59, electrically coupled to the battery module 57 in parallel; and (c) the vehicle control system 100 includes (i) a first controller, shown as motor controller 110, coupled to the motor 53 and including a second sensor, shown as motor controller sensor 114, and (ii) a second controller, shown as battery management system ("BMS") 112, coupled to the motor controller 110 and the energy storage 54 (e.g., the battery system, the battery module 57, the add-on battery module(s) 59, etc.) and including a third sensor, shown as BMS sensor 116. In some embodiments, the motor 42 is configured as a separately excited DC motor. The motor sensor 92, the motor controller sensor 114, and/or the BMS sensor 116 may include a temperature sensor, a voltage sensor, a current sensor, a speed sensor, and/or another suitable sensor to facilitate monitoring at least one of the operational parameters (e.g., temperature, voltage, current, speed, SOC, rate of charge, rate of discharge, etc.) of the motor 53, the motor controller 110, the BMS 112, the battery module 57, and/or the add-on battery modules(s) 59. The motor controller 110 and the BMS 112 may each include a processing circuit 102, a memory 104, and a communications interface 106.

According to an exemplary embodiment, each of the battery module 57 and the add-on battery module(s) 59 of the battery system includes one or more rows/groups of battery cells. The BMS 112 may be configured to monitor characteristics of the rows/groups of battery cells and/or individual cells of the battery module 57 and the add-on battery module(s) 59 (e.g., using data acquired by the BMS sensor 116) including, but not limited to, voltage, temperature, current, and state of charge ("SOC"). The BMS 112 may also be configured to provide direct current ("DC") power from the battery system to the motor controller 110 to power the motor 53 based on driving demands of the vehicle 10.

According to an exemplary embodiment, the motor controller 110 is configured to manage the power supplied to the motor 53. By way of example, the motor controller 110 may be configured to modulate the voltage, current, phase, and/or frequency of the power sent to the motor windings 55, which can influence the torque and speed output provided by the motor 53. In some embodiments, the motor controller 110 is configured to control a type of power, AC power or DC power, delivered to the motor 53. By way of example, the motor controller 110 may be configured to convert the type of power from DC power to AC power and/or regulate the AC power or DC power depending on the intended function of the motor 53. The motor controller 110 may include components to invert, convert, or otherwise modulate DC power and/or AC power.

As shown in FIG. 3, the energy storage 54 is configured to supply (e.g., via electrical wiring, electrical connections, etc.) DC power to the motor controller 110. In some embodiments, the DC power flows from the energy storage 54, through the BMS 112, and to the motor controller 110. The BMS 112 and the motor controller 110 may include communication interfaces (e.g., communications interfaces 106) that facilitate exchanging data related to operational status, command signals, and feedback therebetween. The BMS 112 and the add-on battery module 59 (e.g., a BMS thereof) may include communication interfaces that facilitate exchanging data related to operational status, command signals, and feedback therebetween. The add-on battery module(s) 59 is(are) configured to provide additional battery cells and increase the total energy storage capacity of the energy storage 54. As shown in FIG. 3, the battery module 57 and the add-on battery module(s) 59 are connected in parallel (e.g., via wires, connection busses, etc.) to provide for a pathway of electrical transfer. In other embodiments, the battery module 57 and the add-on battery module(s) 59 are connected in series.

According to an exemplary embodiment, the BMS 112 is configured to monitor (e.g., continuously, periodically, etc.) various parameters of the energy storage 54, including voltage, current, and temperature of each cell, row/group, and/or module within the energy storage 54. In some embodiments, the BMS 112 is configured to calculate or otherwise determine the SOC of the energy storage 54, the battery module 57, and/or the add-on battery module(s) 59. In some embodiments, the BMS 112 is configured to redistribute charge among the cells, rows/groups, and/or the modules to ensure an equal or substantially equal charge level throughout the energy storage 54. The BMS 112 can communicate with other systems or components or the vehicle 10 or with external devices (e.g., the remote systems 240) to report on battery status and diagnostics and/or to receive control commands.

According to an exemplary embodiment, the BMS 112 is configured to detect faults or failures in the energy storage 54 that may potentially lead to or that have caused an overcharge condition and, thereby, a thermal runaway event. By way of example, the BMS 112 may be configured monitor the voltage of individual cells, rows/groups, or modules of the energy storage 54, and when deviations from normal voltage levels occur beyond a nominal range, the BMS 112 may determine that a fault or failure is present and that there is a potential for an overcharge condition or that there is an actual overcharge condition. By way of another example, the BMS 112 may additionally or alternatively be configured to monitor current flows during charging and discharging of the energy storage 54 and identify unexpected fluctuations in current that may indicate that a fault or failure is present and that there is a potential for an overcharge condition or that there is an actual overcharge condition. By way of still another example, the BMS 112 may additionally or alternatively be configured to monitor the temperature of the cells, rows/groups, and/or modules of the energy storage 54 and identify anomalously high temperatures that may indicate that a fault or failure is present and that there is a potential for an overcharge condition or that there is an actual overcharge condition. It should be understood that the above example of detecting faults, failures, or overcharge conditions is provided for example purposes only and is not exhaustive. Other methods or techniques may be implemented to detect faults, failures, or overcharge conditions, which are intended to be included within the scope of the present disclosure. Additional details regarding fault detection regarding the energy storage 54 is described in greater detail herein. Further details regarding fault detection, including voltage imbalance, may be found in U.S. patent application Ser. No. 18/884,363, filed Sep. 13, 2024, which is incorporated herein by reference in its entirety.

Site Monitoring and Control System

Figure 4:
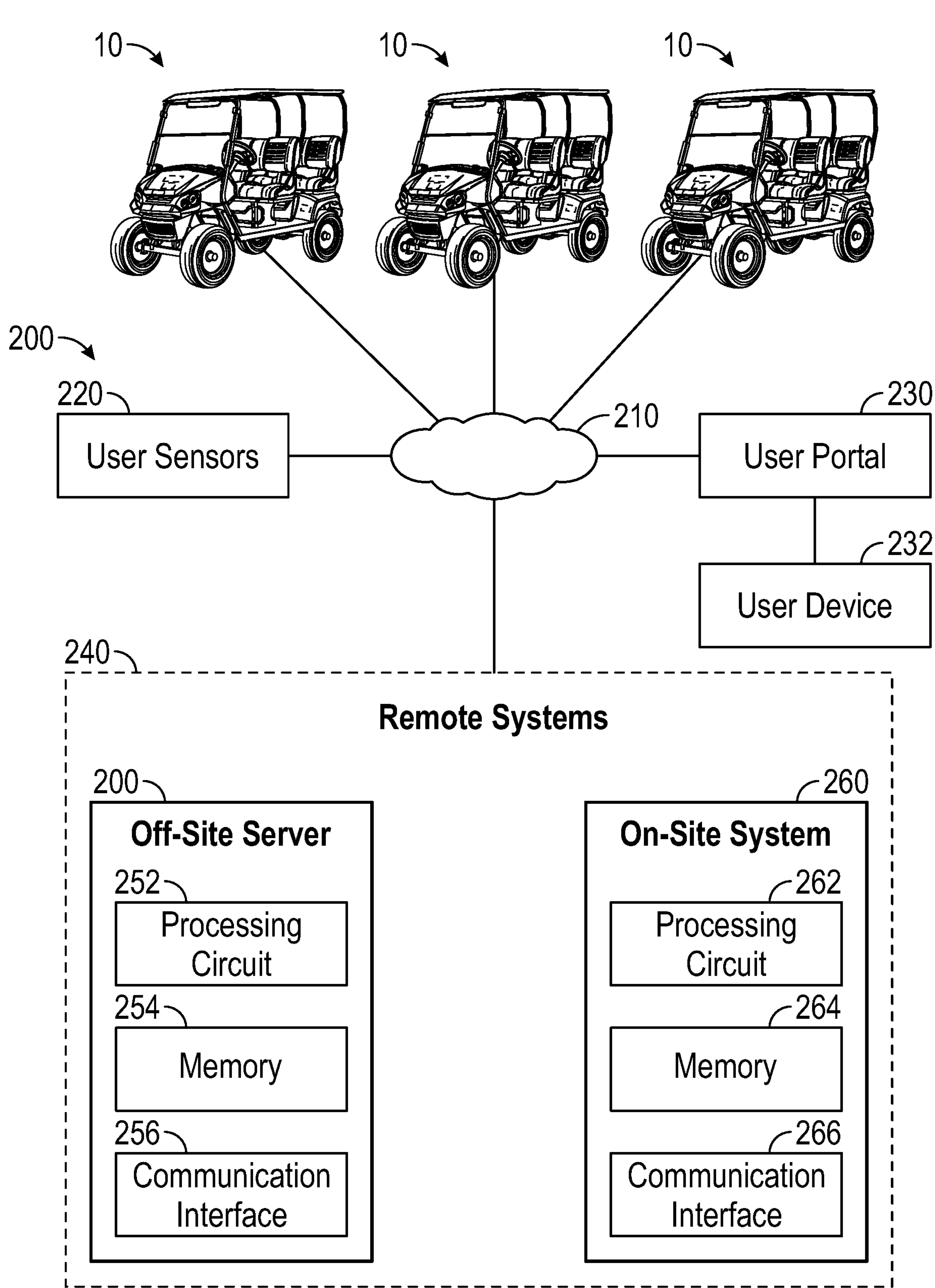
FIG. 4 is a schematic block diagram of a site monitoring and control system including a plurality of the vehicles of FIG. 1, according to an exemplary embodiment.

As shown in FIG. 4, a monitoring and control system, shown as site monitoring and control system 200, includes one or more vehicles 10; one or more second sensors, shown as user sensors 220, positioned remote or separate from the vehicles 10; an operator interface, shown as user portal 230, positioned remote or separate from the vehicles 10; an external or remote user device, shown as user device 232, positioned remote or separate from the vehicles 10 and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, heart rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The user portal 230 may be configured to facilitate operator access to dashboards including the vehicle data, the operator data, information available at the remote systems 240, etc. to manage and operate the site (e.g., golf course) such as for advanced scheduling purposes, to identify persons breaking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). As shown in FIG. 4, the user portal 230 is accessible via the user device 232. The user device 232 may be or include a computer, laptop, smartphone, tablet, or the like. The user portal 230 and the user device 232 may communicate via one or more communications protocols (e.g., Bluetooth, Wi-Fi, cellular, radio, through the Internet, wired connection, etc.) through a network (e.g., a CAN bus, the communications network 210, etc.). The user device 232 includes a display (e.g., a screen, etc.) configured to display one or more graphical user interfaces ("GUIs") of the user portal 230.

As shown in FIG. 4, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 4, (a) the off-site server 250 includes a processing circuit 252, a memory 254, and a communications interface

256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle control systems 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Detecting Moisture

Moisture intrusion (e.g., liquid water, water vapor, etc.) into a battery pack can lead to faults such as short-circuiting, corrosion of internal components, and degradation of battery cells. The presence of moisture can disrupt the balance of voltages between battery cells, leading to unbalanced charge levels, which reduces battery efficiency and lifespan. In some cases, moisture can cause electrical failures. Early detection of moisture allows for timely intervention, such as initiating mitigation actions, disabling the battery, or activating drainage mechanisms. Accordingly, the systems and methods, as described in greater detail herein, are configured to detect moisture in battery packs.

The battery module 57 and add-on battery module(s) 59 may be collectively referred to as battery pack(s) 57/59. As shown in FIG. 5A-5G, the battery pack(s) 57/59 include a first plurality or group of sensors, shown as moisture sensors 51, disposed about and/or within a housing of the battery pack(s) 57/59. FIG. 5B-5G illustrate various configurations of the moisture sensors 51 positioned at strategic low points on the battery pack(s) 57/59 to detect water intrusion in different orientations of the battery pack(s) 57/59. The moisture sensors 51 can be placed at various locations such as the top, bottom, corners, center, along the sides, edges, near connectors, and/or adjacent to or proximate critical components within the battery pack(s) 57/59 to ensure comprehensive moisture detection across multiple orientations.

According to an exemplary embodiment, the vehicle control system 100 is configured to monitor moisture within the energy storage 54 (e.g., the battery system, the battery module 57, the add-on battery module(s) 59, etc.). The vehicle control system 100, via the BMS 112, is programmed and/or configured to continuously or periodically acquire moisture signals from the plurality of sensors 51. To facilitate moisture detection, the moisture sensors 51 are each strategically positioned at a respective low point within and about the housing of the battery pack(s) 57/59. The low points correspond to particular orientations of the battery pack(s) 57/59, ensuring that moisture is detected regardless of the spatial orientation of the battery pack(s) 57/59. By placing the moisture sensors 51 at the low points, the vehicle control system 100 may detect the accumulation of water at the most vulnerable locations within the energy storage 54. Regardless of how the battery pack(s) 57/59 is(are) positioned relative to the chassis 12 or regardless of the pitch and/or roll of the vehicle 10, at least one moisture sensors 51 is located at or proximate the lowest point where moisture would likely accumulate. Such configuration ensures that at least one moisture sensor 51 will be triggered when water or moisture enters the battery pack(s) 57/59, allowing for early detection and appropriate responses by the vehicle control system 100. In one embodiment, the data collected by the moisture sensors 51 may be transmitted to or acquired by the BMS 112 and/or the vehicle control system 100, where the data can be processed and analyzed. In some implementations, the BMS sensor 116 may include the moisture sensors 51.

Figure 5A:
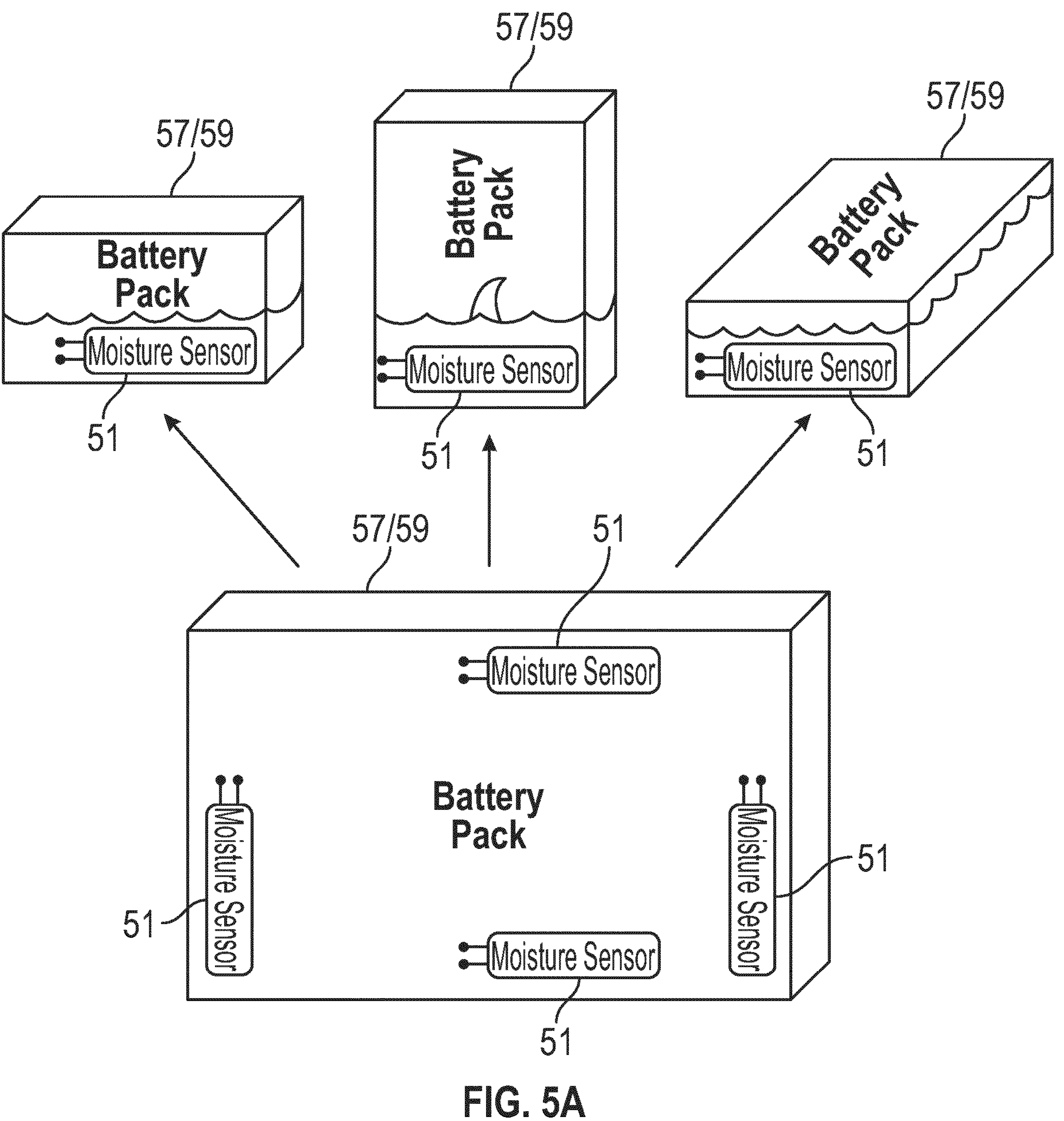
FIG. 5A-5G are various schematic block diagrams illustrating moisture sensors disposed about a battery pack, according to an exemplary embodiment.
Figure 5B:
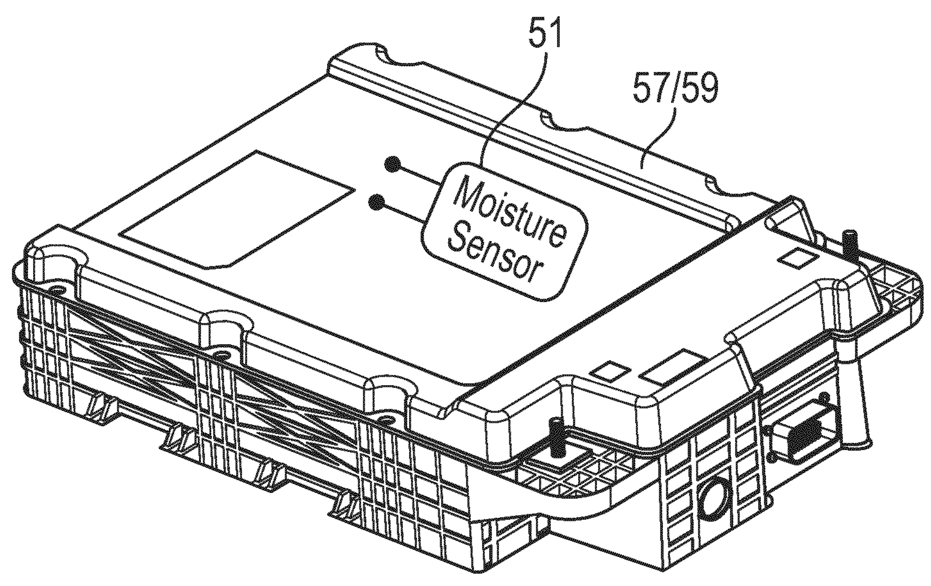
Figure 5C:
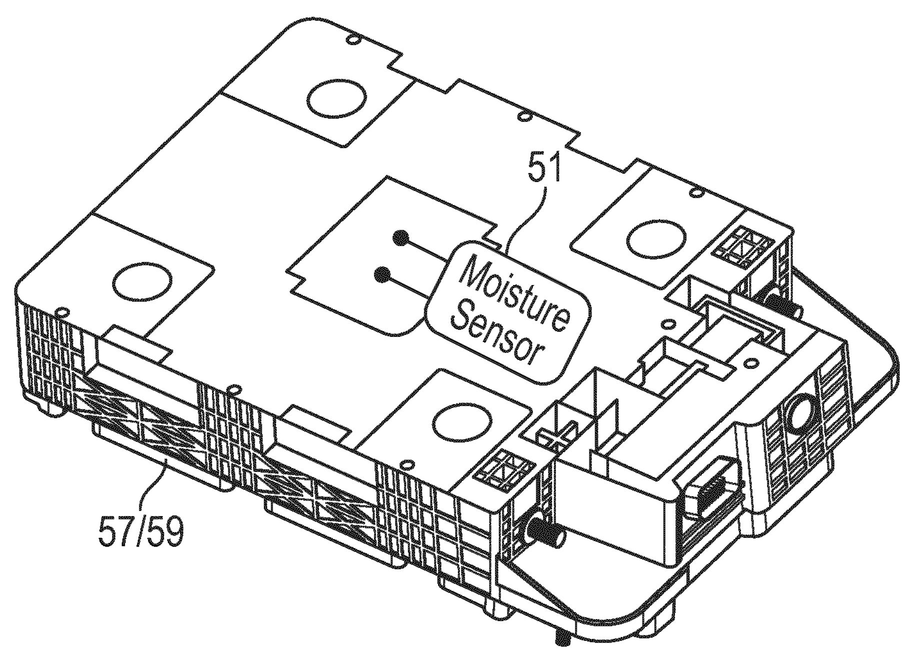
Figure 5D:
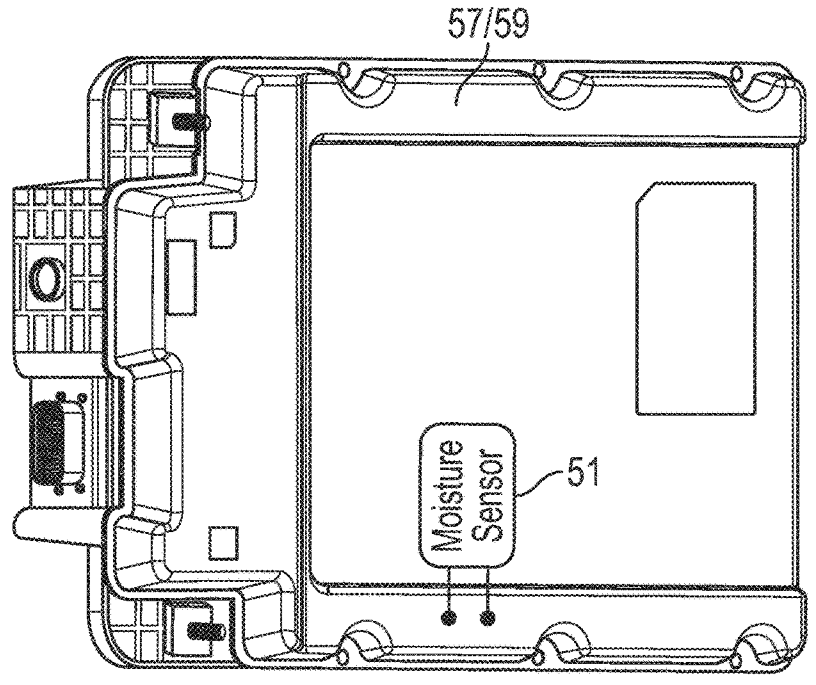
Figure 5E:
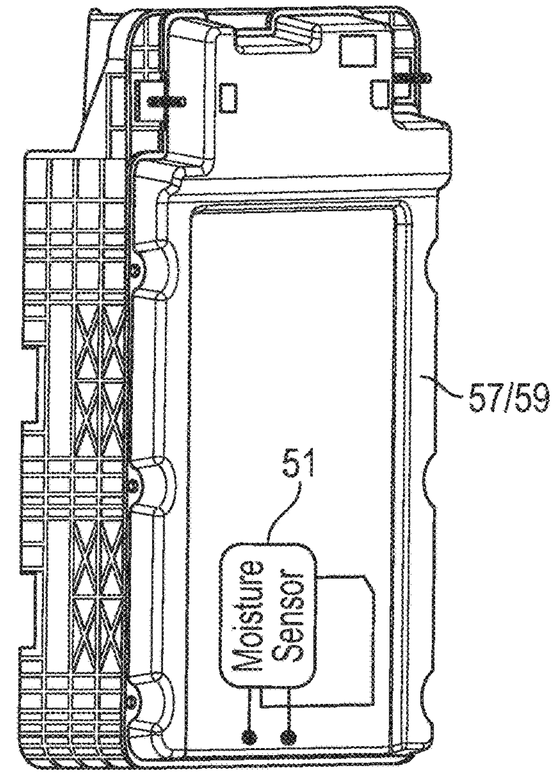
Figure 5F:
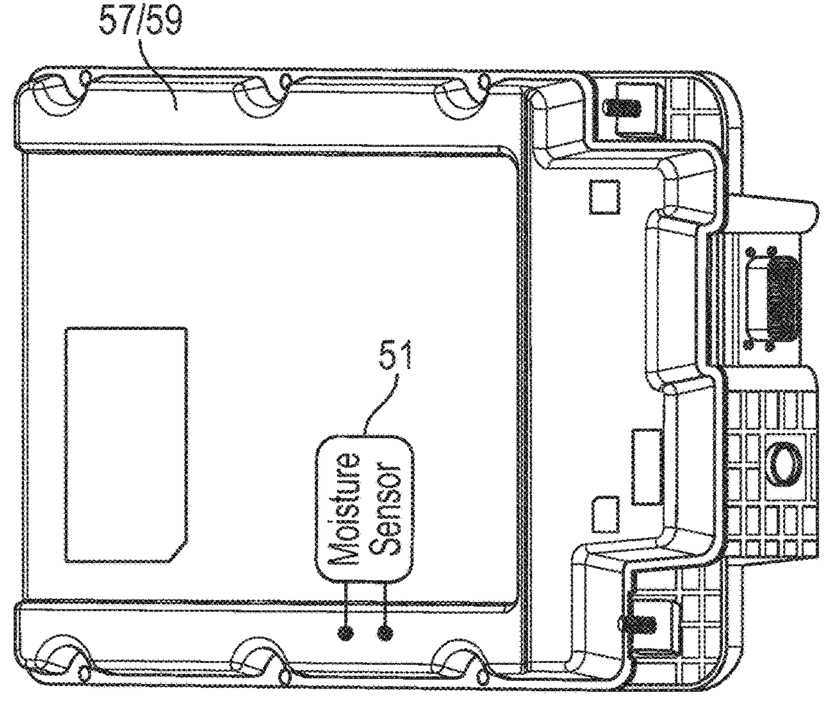
Figure 5G:
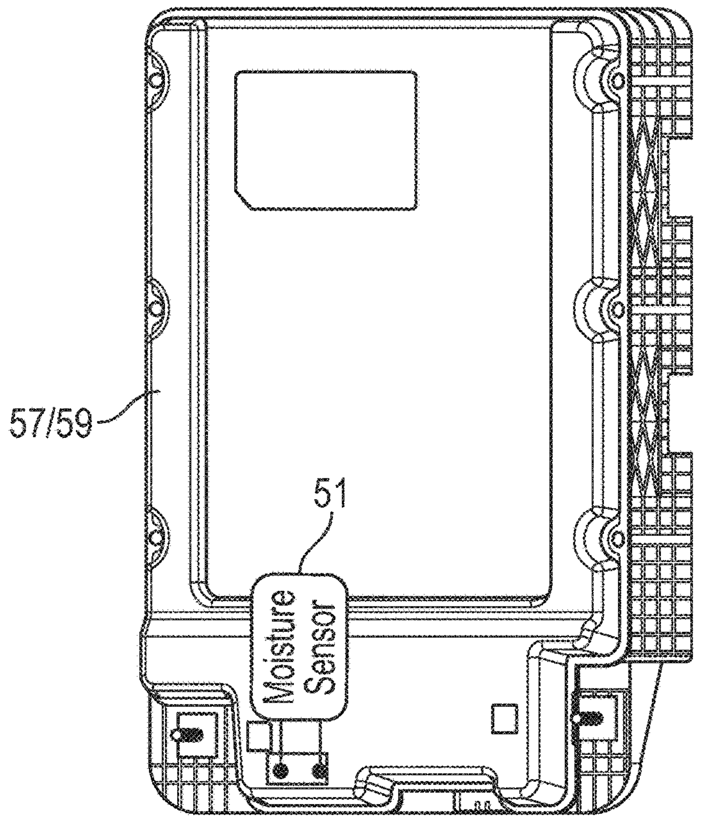

In some embodiments, the vehicle control system 100 is configured to determine the particular orientations of the battery pack(s) 57/59. By analyzing which moisture sensor 51 or combination of moisture sensors 51 is detecting moisture, the vehicle control system 100 can determine the orientation of the battery pack(s) 57/59, as each moisture sensors 51 is positioned at a low point relative to specific orientations. By way of example, the vehicle control system 100 may be configured to determine a particular installed orientation of a plurality of possible orientations of the battery pack(s) 57/59 relative to the chassis 12. The plurality of possible orientations are shown in FIG. 5A, which include a side orientation where the battery pack(s) 57/59 lie on a side thereof, an upright orientation where the battery pack(s) 57/59 lie on a top or bottom end thereof, and a flat orientation where the battery pack(s) 57/59 lie on a front or rear surface thereof. Accordingly, with the moisture sensors 51 positioned proximate the sidewalls thereof, proximate the ends thereof, and the front/rear faces thereof, the installed orientation of the battery pack(s) 57/59 can be determined when the vehicle 10 is on flat ground. By way of another example, the vehicle control system 100 may be configured to determine a current, spatial orientation of the battery pack(s) 57/59) in space (i.e., relative to a ground surface). For example, if the vehicle 10 and, therefore, the battery pack(s) 57/59, is tilted, the moisture will accumulate at a lowest point of the battery pack(s) 57/59 associated with the direction of tilt. For example, when the vehicle 10 is on uneven terrain, moisture will gravitate to different locations depending on the angle of the battery pack 57/59. One or more of the moisture sensors 51 located at or near the lowest point will then detect the moisture and trigger a signal. By correlating the location of activated moisture sensor(s) 51 with the moisture sensor 51 predefined position relative to the battery pack(s) 57/59, the vehicle control system 100 can determine the orientation (e.g., spatial orientation) of the battery pack(s) 57/59 and, therefore, the vehicle 10 in real time. The plurality of moisture sensor 51 are distributed in such a way that at least one moisture sensor 51 is always positioned at the lowest point of the battery pack 57/59, regardless of its orientation relative to the chassis 12; the distribution ensures comprehensive coverage.

In some embodiments, the vehicle control system 100 is configured to determine the severity of the moisture intrusion by evaluating an intensity of a moisture signal from each moisture sensor 51. The intensity of the moisture signal from each sensor 51 can provide an indication of the volume or concentration of moisture at a particular location within the energy storage 54 and the severity of the moisture intrusion. For instance, a higher signal intensity may indicate a greater accumulation of water, suggesting a more severe moisture intrusion. Additionally, the vehicle control system 100 can analyze the number of moisture sensor 51 that are activated simultaneously; a greater number of triggered moisture sensor 51 indicates that moisture has spread across multiple areas of the battery pack, further increasing the severity of the moisture intrusion. The vehicle control system 100 can assess whether the moisture intrusion is localized and minor or more widespread and serious, enabling the battery system to take appropriate mitigation actions based on the level of risk.

In some embodiments, the vehicle control system 100 includes one or more second sensors. The second sensors are configured to detect orientation and/or motion characteristics of the vehicle 10 and/or the battery pack 57/59, providing additional data that complements the moisture data acquired by the moisture sensors 51. By incorporating the second sensors, the vehicle control system 100 accurately assesses the spatial positioning and movement of the battery pack 57/59, further enhancing the reliability and accuracy of moisture detection and associated mitigation actions. The second sensors may be included within the BMS 112, within the energy storage 54, within the battery pack 57/59, or external to the battery pack 57/59 (e.g., one of the sensors 90 of the vehicle 10 generally). While the moisture sensors 51 are configured or positioned to facilitate detecting moisture at low points in the battery pack 57/59, the second sensors provide data on how the vehicle 10 or battery pack 57/59 is oriented or moving, ensuring that shifts in position or motion are accurately tracked.

According to an exemplary embodiment, the second sensors (are configured to detect and measure an orientation, acceleration, and angular velocity of the vehicle 10 and/or the battery pack(s) 57/59. The orientation (e.g., orientation characteristics) of the vehicle 10 and/or the battery pack(s) 57/59 may include an inclination, a tilt, or a roll relative to gravity. For example, inclination refers to the angle at which the vehicle 10 and/or the battery pack(s) 57/59 is leaning forward or backward relative to level. If a golf vehicle is traveling uphill, the battery pack(s) 57/59 may be inclined backward inclination, while going downhill would result in a forward inclination. In another examples, when the vehicle 10 is on uneven terrain or a slope, the battery pack(s) 57/59 may be tilted to the left or right, depending on the direction of the slope. Roll describes the rotational movement of the vehicle 10 and/or the battery pack(s) 57/59 along a longitudinal axis. For example, if the vehicle 10 takes a sharp turn, the battery pack(s) 57/59 may experience a rolling motion, where the battery pack(s) 57/59 slightly rotate around the longitudinal axis as the vehicle 10 maneuvers through the turn. The orientation characteristics detect how moisture might pool within the battery pack(s) 57/59 and influence system performance.

In some embodiments, the second sensors are IMUs, accelerometers, and/or gyroscopes. The second sensors (e.g., IMU sensors) are configured to provide data to the BMS 112 and/or vehicle control system 100 regarding movement and tilt across multiple axes (e.g., pitch, roll, and yaw). The second sensors (e.g., accelerometers) may be configured to measure linear acceleration along one or more axes, which facilitates detecting changes in velocity and movement. The second sensors may be configured to determine the orientation of an object by measuring a force of gravity relative to the sensor position.

According to an exemplary embodiment, the vehicle control system 100 is configured to determine whether moisture detected at a higher point in the battery pack 57/59 is consistent with expected water pooling behavior by analyzing the motion characteristics (e.g., orientation), such as tilt, inclination, or roll. For example, if the second sensor detects that the vehicle 10 is on level ground, moisture should collect at the lowest points of the battery pack(s) 57/59 based on the installed orientation. However, if moisture is detected at a higher location, the vehicle control system 100 may cross-reference the orientation or motion data to assess whether this detection is abnormal or consistent with expected water pooling behavior. If the vehicle 10 is tilted or experiencing motion, such as rolling or inclining uphill, the vehicle control system 100 can determine that moisture may have shifted from a typical pooling point to a higher area due to the vehicle 10 orientation. The vehicle control system 100 is configured to differentiate between a normal shift in water location caused by vehicle 10 movement and potential inaccuracies of the moisture sensors 51, enabling more reliable moisture detection and mitigation responses. The vehicle control system 100 confirms the severity of moisture presence of the battery pack 57/59 by comparing the moisture signals from the moisture sensors 51 with the orientation or motion signals from the second sensors, ensuring accurate assessment and appropriate mitigation actions.

The data collected by the BMS 112 regarding the battery system (e.g. energy storage 54) from the moisture sensors 51 and the second sensors may be stored in the memory 104 for real-time analysis and future reference. The data may be utilized by the BMS 112 to monitor the health and performance of the battery system, assess moisture levels, and determine mitigation actions. Additionally, the data collected by the BMS 112 may be used for predictive maintenance, allowing the battery system to identify patterns or trends in moisture detection and battery behavior.

In accordance with one or more exemplary embodiments, the vehicle control system 100 can include a processing circuit (e.g., on-board processing circuit) located on the vehicle 10, which is responsible for real-time monitoring, control, and management of the vehicle 10 systems, including the battery pack. The on-board processing circuit allows the vehicle 10 to respond immediately to any detected issues or changes in operating conditions. The vehicle control system 100 can include a second processing circuit located remote from the vehicle 10. The second processing circuit enables external monitoring, diagnostics, and system updates, providing the ability to analyze data and manage the vehicle 10 performance from a distance. The combination of both on-vehicle and remote processing circuits ensures comprehensive control and flexibility in maintaining and optimizing the vehicle 10 operations.

Mitigating Actions

In some embodiments, in response to detecting moisture within energy storage 54 (e.g., battery packs 57/59), the vehicle control system 100 is configured to initiate a mitigating action. The mitigating action may include transmitting a notification to a user (e.g., on the operator interface 48, on the user portal 230, on the user device 232, etc.). The notification may inform the user of the detected moisture. The notification can be transmitted through a vehicle display system, mobile app, or directly to vehicle dashboard warning lights. The notification can be triggered immediately upon detecting the moisture, especially if the vehicle control system 100 determines that the issue may affect the vehicle performance.

According to an exemplary embodiment, the mitigating action(s) can include automated responses. The vehicle control system 100 can set a fault, triggering an alert or warning that can be logged for diagnostic purposes. In some cases, where the detected moisture poses a significant risk to the functionality of the battery pack, the vehicle control system 100 may disable the battery pack entirely or perform a controlled discharge procedure to prevent potential damage.

Such disabling actions may, therefore, prevent operating the vehicle 10 with a compromised battery. Further details regarding possible mitigating actions may be found in U.S. patent application Ser. No. 18/797,207, filed Aug. 7, 2024, which is incorporated herein by reference in its entirety.

In some embodiments, the mitigation action includes disabling the battery pack 57/59, initiating a controlled discharge, or activating a drainage mechanism within the battery pack 57/59. Disabling the battery pack 57/59 can prevent further electrical or thermal damage when moisture intrusion is detected, ensuring the optimal performance of both the vehicle 10 and the battery pack 57/59. Initiating a controlled discharge helps to reduce the battery pack 57/59 charge level. In addition, the drainage mechanism can be triggered to remove accumulated water from the battery pack 57/59, reducing the chance of corrosion or damage to internal components. The mitigating actions, combined with timely notifications to the user, allow for effective and automated responses to moisture detection, preserving battery pack 57/59 and vehicle 10 performance.

In some embodiments, the vehicle control system 100 is configured to selectively activate different mitigation actions based on the respective location of the moisture sensors 51 that are triggered or activated, the severity of the moisture presence, and the orientation of the battery pack 57/59. For instance, if a moisture sensor 51 positioned at the bottom of the battery pack detects a minor amount of moisture, the vehicle control system 100 may initiate a notification to the user and log the event for further inspection. However, if multiple moisture sensors 51 at different locations detect significant moisture, the vehicle control system 100 may disable the battery pack 57/59 to prevent potential damage or initiate a controlled discharge to reduce the charge and avoid electrical hazards. By analyzing the location of activated moisture sensors 51, the severity of moisture detected, and the battery pack 57/59 orientation, the system ensures appropriate and precise mitigation actions are taken to protect the battery and ensure vehicle safety.

According to an exemplary embodiment, the mitigating action(s) can activate a drainage mechanism. For example, if the battery pack 57/59 is oriented in a way that exacerbates moisture accumulation, such as tilted to one side, the vehicle control system 100 may activate a drainage mechanism to remove water from the affected areas. The drainage mechanism includes opening small drainage valves located at the base of the battery pack 57/59, allowing water to escape from a battery pack 57/59 housing. In some implementations, a pump could be used to actively move water out of areas where it has pooled, preventing further accumulation. By channeling the water out of the battery pack 57/59 through designated pathways, the vehicle control system 100 helps reduce the risk of electrical shorts, corrosion, and degradation of the battery cells.

Monitoring and Managing Moisture

Figure 6:
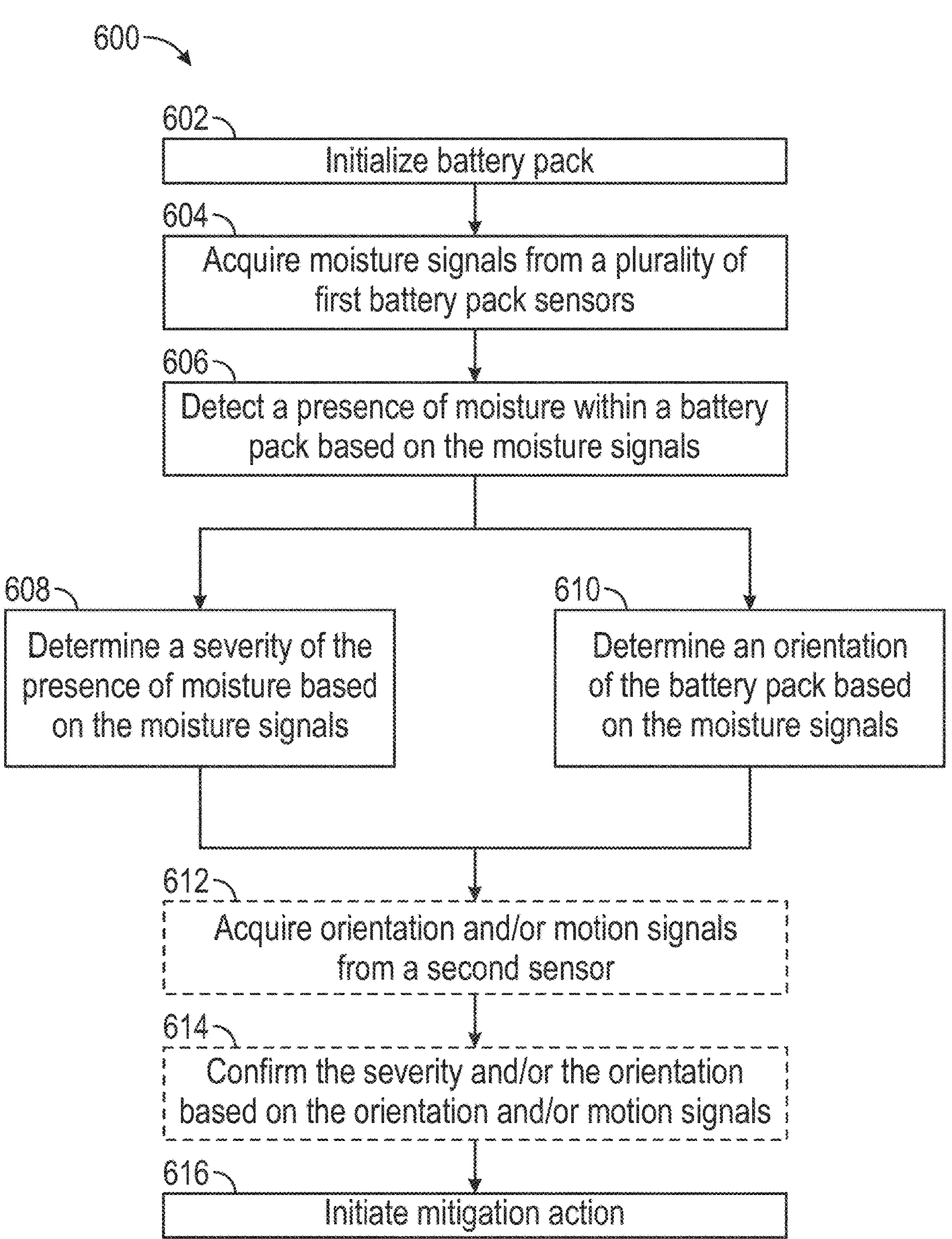
FIG. 6 is a block diagram of method for moisture detection within a battery pack, according to an exemplary embodiment.

As shown in FIG. 6, a method 600 for detecting and managing moisture within a battery system is depicted. Method 600 may be performed by the vehicle control system 100 (e.g., the BMS 112, the vehicle control system 100, etc.). The method 600 may be implemented using any one or more of the components and devices detailed herein in conjunction with FIG. 1-5. Additional, fewer, or different operations may be performed in the method 600 depending on the embodiment. At least one aspect of the operations is directed to a system, method, apparatus, or a computer-readable medium.

At step 602, the method 600 begins by initializing a battery pack (e.g., battery pack 57/59). A vehicle control system (e.g., the vehicle control system 100, the BMS 112, etc.) is configured to monitor the battery pack (e.g., the energy storage 54, the battery module 57, the add-on battery module(s) 59, etc.) of a vehicle (e.g., the vehicle 10). At step 604, the vehicle control system acquires moisture signals from a plurality of first battery pack sensors (e.g., moisture sensors 51), which are strategically placed throughout the battery pack to detect the presence of moisture.

At step 606, the vehicle control system detects the presence of moisture within the battery pack based on the moisture signals received from the first battery pack sensors. Following the detection, the vehicle control system proceeds to step 608 and step 610. At step 608, the vehicle control system determines the severity of the presence of moisture based on an intensity and/or a location of the moisture signals. Simultaneously or alternatively, at step 610, the vehicle control system determines the orientation (e.g., spatial orientation such as inclination, tilt, or roll relative to the ground surface) of the battery pack by analyzing the moisture signals in relation to the positioning of the first battery pack sensors.

If further verification is needed, at step 612, the vehicle control system acquires orientation and/or motion signals from a second sensor(s) (e.g., an IMU, accelerometer, gyroscope, etc.), to provide additional data regarding the orientation and/or movement the battery pack. The verification helps prevent false positives caused by temporary shifts in orientation or dynamics of the vehicle, ensuring that the vehicle control system only responds to true water intrusion scenarios. At step 614, the orientation and/or motion signals is used to confirm the severity of the moisture presence and/or the orientation of the battery pack based on the orientation and/or motion signals, ensuring more accurate results. At step 616, the vehicle control system is configured to initiate a mitigation action, such as sending a notification, disabling the battery pack, initiating a controlled discharge, or activating a drainage mechanism, based on the confirmed severity or orientation data.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and descriptions may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle control system 100, etc.) and the site monitoring and control system 200 (e.g., the remote systems 240, the user portal 230, the user sensors 220, etc.) as shown in the various exemplary embodiments is illustrative only. Additionally, any element disclosed in one embodiment may be incorporated or utilized with any other embodiment disclosed herein.

The invention claimed is:

1. A golf vehicle system comprising:
a golf vehicle including:
a chassis;
a battery pack supported by the chassis, the battery pack oriented relative to the chassis in a respective orientation of a plurality of possible orientations;

a plurality of sensors positioned at various locations about the battery pack, the plurality of sensors configured to facilitate detecting moisture, each sensor of the plurality of sensors located at a respective point of the battery pack relative to a particular orientation of the plurality of possible orientations of the battery pack; and a vehicle control system configured to:

acquire moisture signals from the plurality of sensors;

determine the respective orientation of the battery pack and a severity of a presence of moisture within the battery pack based on the moisture signals;

initiate a mitigation action based on the severity of the presence of moisture within the battery pack; and selectively activate different mitigation actions based on a respective location of a respective sensor of the plurality of sensors activated by the presence of moisture within the battery pack, the severity of the presence of moisture within the battery pack, and the respective orientation of the battery pack.

2. The golf vehicle system of claim 1, wherein the mitigation action includes at least one of: disabling the battery pack, initiating a controlled discharge, activating a drainage mechanism within the battery pack, or transmitting a notification to a user.

3. The golf vehicle system of claim 1, wherein the severity of the presence of moisture is determined based on a number of the plurality of sensors detecting the presence of moisture.

4. The golf vehicle system of claim 1, wherein the respective orientation of the battery pack is determined by identifying which sensor or combination of sensors from the plurality of sensors detect the presence of moisture.

5. The golf vehicle system of claim 1, wherein the plurality of sensors are distributed about the battery pack such that at least one sensor of the plurality of sensors is always positioned at a lowest point of the battery pack, irrespective of the particular orientation of the battery pack relative to the chassis.

6. The golf vehicle system of claim 1, wherein the plurality of sensors is a plurality of first sensors, further comprising a second sensor configured to facilitate detecting at least one of orientation characteristics or motion characteristics of at least one of the golf vehicle or the battery pack.

7. The golf vehicle system of claim 6, wherein the orientation characteristics include at least one of an inclination, a tilt, or a roll relative to a ground surface.

8. The golf vehicle system of claim 6, wherein the second sensor is part of the battery pack.

9. The golf vehicle system of claim 6, wherein the second sensor is separate from the battery pack.

10. The golf vehicle system of claim 6, the vehicle control system is configured to confirm the severity of the presence of moisture and the respective orientation of the battery pack based on the at least one of the orientation characteristics or the motion characteristics.

11. The golf vehicle system of claim 6, the second sensor includes an inertial measurement unit (IMU), an accelerometer, or a gyroscope.

12. The golf vehicle system of claim 6, wherein the vehicle control system is configured to determine whether moisture detected at a higher point in the battery pack is consistent with expected water pooling behavior based on the motion characteristics.

13. A vehicle system comprising:

a battery pack configured to be oriented in a respective orientation of a plurality of possible orientations when installed on a vehicle;

a plurality of sensors positioned at various locations about the battery pack, the plurality of sensors configured to facilitate detecting moisture, each sensor of the plurality of sensors located at a respective low point of the battery pack relative to a particular orientation of the plurality of possible orientations of the battery pack; and a control system configured to:

acquire moisture signals from the plurality of sensors;

determine the respective orientation of the battery pack and a severity of a presence of moisture within the battery pack based on the moisture signals, wherein the respective orientation of the battery pack is a spatial orientation of the battery pack relative to a chassis of the vehicle;

initiate a mitigation action based on the severity of the presence of moisture within the battery pack; and selectively activate different mitigation actions based on a respective location of a respective sensor of the plurality of sensors activated by the presence of moisture within the battery pack, the severity of the presence of moisture within the battery pack, and the respective orientation of the battery pack.

14. The vehicle system of claim 13, further comprising the vehicle.

15. A vehicle system comprising:

a battery pack configured to be oriented in a respective orientation of a plurality of possible orientations when installed on a vehicle;

a plurality of first sensors positioned at various locations about the battery pack, the plurality of first sensors configured to facilitate detecting moisture, each sensor of the plurality of first sensors located at a respective low point of the battery pack relative to a particular orientation of the plurality of possible orientations of the battery pack;

a second sensor configured to facilitate detecting at least one of an orientation characteristic or a motion characteristic of the battery pack, the orientation characteristic including a spatial orientation of the battery pack relative to a chassis of the vehicle, the motion characteristic including at least one of an orientation of the battery pack relative to a ground surface, an angular velocity of the battery pack, or an acceleration of the battery pack; and a control system configured to:

acquire moisture signals from the plurality of first sensors;

determine the respective orientation of the battery pack and a severity of a presence of moisture within the battery pack based on the moisture signals;

acquire at least one of orientation signals or motion signals from the second sensor;

confirm at least one of the severity of the presence of moisture or the respective orientation of the battery pack based on the at least one of the orientation signals or the motion signals;

initiate a mitigation action based on the severity of the presence of moisture within the battery pack; and selectively activate different mitigation actions based on a respective location of a respective sensor of the plurality of first sensors activated by the presence of moisture within the battery pack, the severity of the presence of moisture within the battery pack, and the respective orientation of the battery pack.

16. The vehicle system of claim 15, wherein the control system is configured to determine and confirm the respective orientation of the battery pack and the severity of the presence of moisture within the battery pack based on (a) the moisture signals and (b) the at least one of the orientation signals or the motion signals.

17. The vehicle system of claim 13, wherein the plurality of possible orientations includes a side orientation wherein the battery pack lies on a side of the battery pack.

18. The vehicle system of claim 13, wherein the plurality of possible orientations includes an upright orientation wherein the battery pack lies on a top of the battery pack or a bottom of the battery pack.

19. The vehicle system of claim 13, wherein the plurality of possible orientations includes a flat orientation wherein the battery pack lies on a front of the battery pack or a rear of the battery pack.

20. The vehicle system of claim 13, wherein the plurality of possible orientations includes an upright orientation wherein the battery pack lies on a top of the battery pack or a bottom of the battery pack, a flat orientation wherein the battery pack lies on a front of the battery pack or a rear of the battery pack, and a side orientation wherein the battery pack lies on a side of the battery pack.

* * * * *